United States Patent
Tanaka (10) Patent No.: US 6,178,051 B1
(45) Date of Patent: Jan. 23, 2001

(54) LENS CONTROL APPARATUS

(75) Inventor: Taeko Tanaka, Yokohama (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 09/246,046

(22) Filed: Feb. 5, 1999

(30) Foreign Application Priority Data

Feb. 10, 1998 (JP) ................................................ 10-028395

(51) Int. Cl.$^7$ .................................................. G02B 15/14
(52) U.S. Cl. ............................ 359/698; 359/697; 359/696
(58) Field of Search .................................... 359/696, 697, 359/698, 819; 396/79, 90, 136

(56) References Cited

U.S. PATENT DOCUMENTS

| | | | | |
|---|---|---|---|---|
| 5,276,318 | * | 1/1994 | Hirasawa | 250/201.4 |
| 5,406,069 | * | 4/1995 | Hirasawa | 250/201.4 |
| 5,406,345 | * | 4/1995 | Hirasawa | 396/86 |
| 5,424,776 | * | 6/1995 | Hirasawa | 348/345 |
| 5,786,853 | * | 7/1998 | Ohkawara et al. | 348/358 |
| 5,890,020 | * | 3/1999 | Hirasawa | 396/77 |
| 5,956,528 | * | 9/1999 | Tanaka | 396/52 |
| 6,115,552 | * | 9/2000 | Kanedsa | 396/82 |
| 6,118,945 | * | 9/2000 | Tanaka | 396/79 |

* cited by examiner

Primary Examiner—Georgia Epps
Assistant Examiner—Saeed Seyrafi
(74) Attorney, Agent, or Firm—Robin, Blecker & Daley (57) ABSTRACT

A lens control apparatus includes a lens, a counter which indicates a driving position of the lens, and a control part which initializes a count value of the counter every time the lens passes a predetermined reference position during an image pickup operation.

19 Claims, 12 Drawing Sheets

LENS CONTROL APPARATUS

BACKGROUND OF THE INVENTION

1. Field of the Invention

The present invention relates to a lens such as an inner-focus-type lens system, and more particularly to a control method for the position of the lens.

2. Description of Related Art

Figure 11:
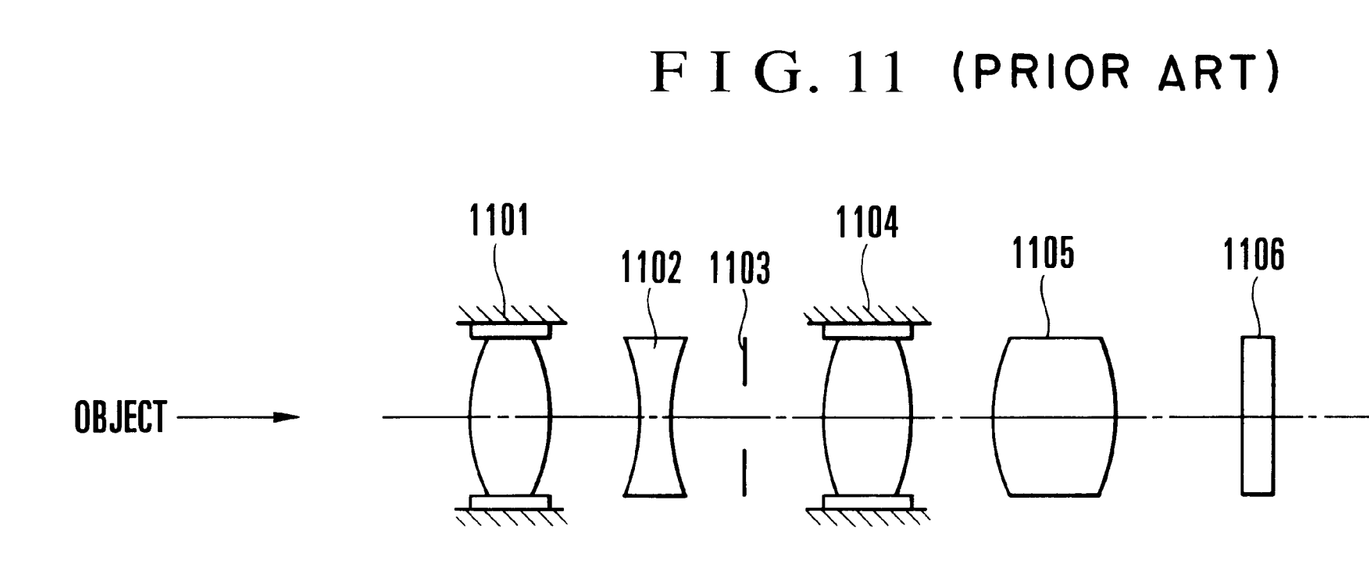
FIG. 11 is a diagram showing the arrangement of an inner-focus-type lens system.

FIG. 11 shows the arrangement of an inner-focus-type lens system. Referring to FIG. 11, the inner-focus-type lens system is composed of a first lens group 1101 which is fixed, a second lens group 1102 for variation of magnification (hereinafter referred to as a variator lens), an iris 1103, a third lens group 1104 which is fixed, a fourth lens group 1105 which has both a focus adjusting function and a so-called compensation function of compensating for the shift of a focal plane due to the variation of magnification (hereinafter referred to as a focusing lens), and an image pickup surface 1106. As is well known, in the lens system arranged as shown in FIG. 11, since the focusing lens 1105 has both the focus adjusting function and the compensating function, the position of the focusing lens 1105 for focusing on the image pickup surface 1106 varies with object distances even if the focal length remains unchanged.

Figure 12:
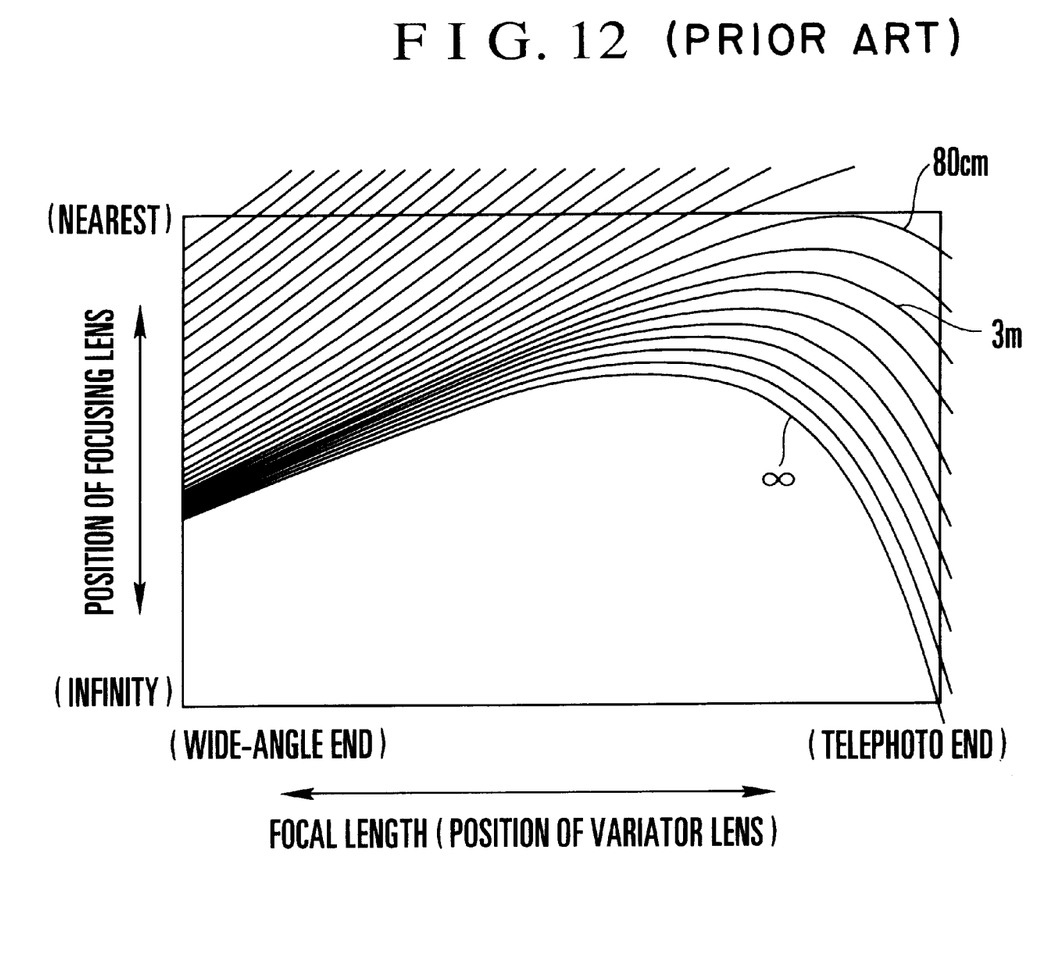
FIG. 12 is a conceptual diagram showing cam locus data.

FIG. 12 is a diagram obtained by serially plotting positions of the focusing lens 1105 for focusing on the image pickup surface 1106 when the object distance is varied for various focal lengths. During zooming, one locus is selected from the loci shown in FIG. 12 according to the object distance, and if the focusing lens 1105 is moved along the selected locus, a zooming operation without blur can be attained. Accordingly, it is general that information on a plurality of loci shown in FIG. 12 is beforehand stored in a lens control microcomputer in some form, one locus is selected according to the positions of the focusing lens 1105 and the varaitor lens 1102, and a zooming operation is performed tracing the selected locus.

However, such a locus tracing method requires the value of each lens position counter to be reset to a predetermined value. In other words, if the value of the lens position counter deviates from a correct value, it becomes impossible to correctly select cam locus information which indicates the relationship between the variator lens position and the focusing lens position stored in the microcomputer, so that a correct cam locus can not be accurately traced during a zooming operation.

Therefore, it is widely practiced that, before an ordinary operation is performed after the power supply is turned on, the variator lens 1102 and the focusing lens 1105 are moved to the respective predetermined reset positions and each of the lens position counters is reset. In this case, the reset positions are generally to be set to the respective mounting positions of photodiodes incorporated in a lens barrel. Then, the lens positions where output signals of the respective photodiodes change are made to be the respective lens reset positions, and the values of the respective lens position counters are set respectively to values decided by balance adjustment of an optical system. Further, during the lens resetting operation, a picked-up image is made not to be outputted because of having large blur, and after completion of the lens resetting operation, a picked-up image is outputted.

In addition, in another proposed method, while a picked-up image is inhibited from being outputted even after completion of the resetting operation of the lens position counters, the lenses are returned to the respective positions where the lens were located before the turning-on of a power supply, so that an angle of view or the like is prevented from being varied due to the lens resetting operation.

Further, it is general in recent years that a pulse motor is used as the motor for driving a lens. In the pulse motor, since a rotation angle relative to a step pulse number is constant, the position of the lens can be detected by incrementing the step pulse number as it is, so that no encoder for position detection is required.

In the above-mentioned example, a lens resetting operation is performed only at a point of time when a power supply is turned on. Therefore, in the case of a surveillance camera or the like operating 24 hours, if an out-of-step phenomenon has occurred due to a change of environment or a disturbance, such as mechanical impact, shut-off of the power supply, electrical noise or radio noise, the power supply must be again turned on (restarting of the power supply) and the lens must be reset.

However, there is a problem in the case of a surveillance camera or the like that if the power supply is made to be turned off, thereby making it impossible to view a picked-up image, the significance of the surveillance camera would be lost.

BRIEF SUMMARY OF THE INVENTION

It is an object of the invention to provide a lens control apparatus capable of always performing a highly accurate lens control irrespective of a change of environment.

Another object of the invention is to provide a lens control apparatus, a lens control method and a storage medium, each of which is capable of always accurately controlling the position of a desired lens without restarting a power supply.

To attain the above objects, in accordance with an aspect of the invention, there is provided a lens control apparatus, which comprises a lens, driving means for driving the lens, position detecting means for detecting that the lens is in a predetermined position, position indicating means for indicating a position of the lens, and rectifying means for rectifying the position indicated by the position indicating means to the predetermined position every time the lens passes the predetermined position.

These and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

It is to be noted that although each of the embodiments is applied to a stand-alone type apparatus, the invention is not limited to such an apparatus but may be also embodied in such a form that an AF microcomputer, a system control microcomputer, a zoom switch, etc., are interconnected via a wired or wireless circuit. Further, the invention is not limited to the form of an apparatus but may be embodied in the form of a method or a storage medium, such as a CD-ROM, which stores therein a program for executing the method.

Figure 1:
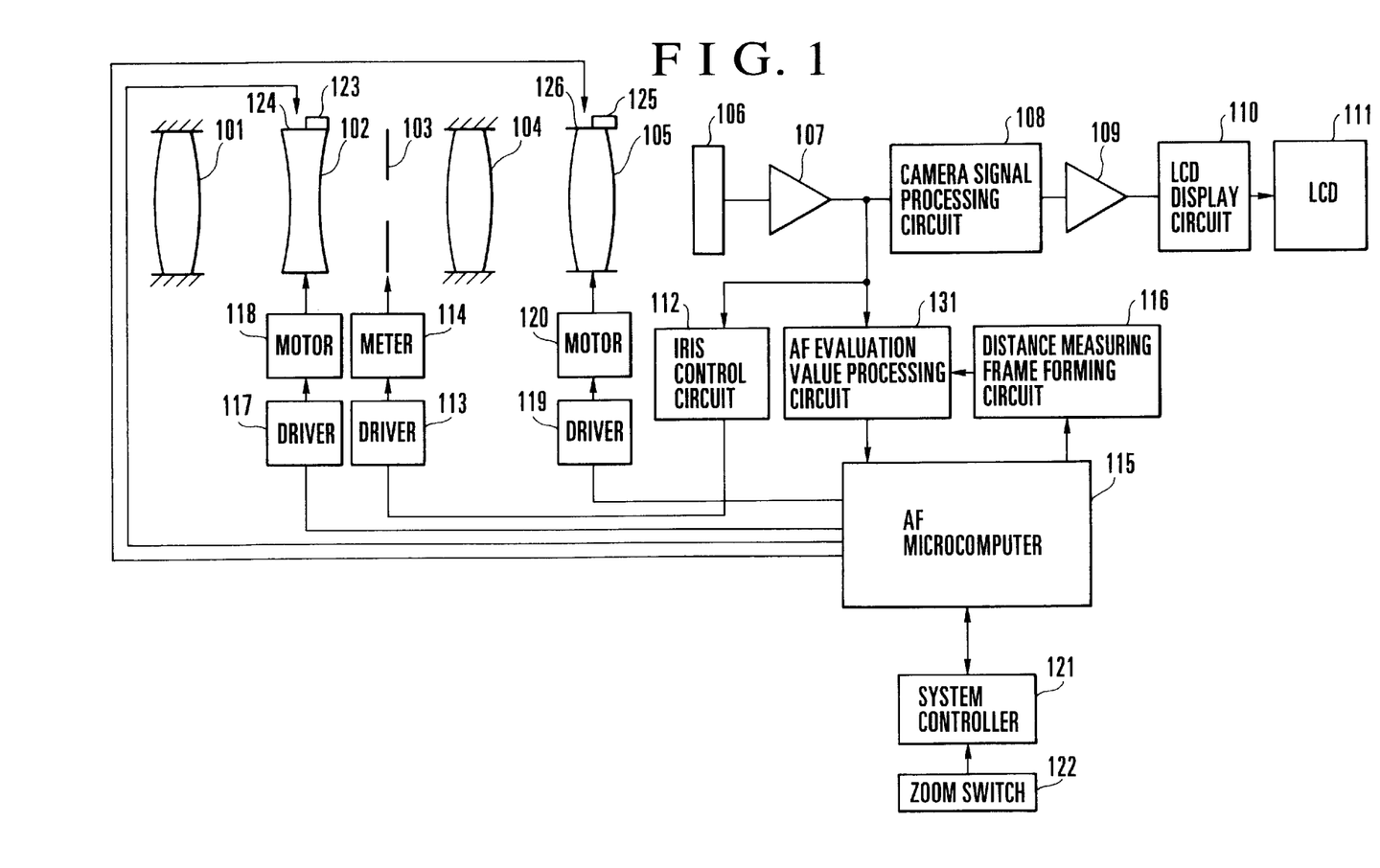
FIG. 1 is a block diagram showing the arrangement of a first embodiment of the invention.

FIG. 1 is a block diagram showing the arrangement of a lens control apparatus according to a first embodiment of the invention.

Referring to FIG. 1, elements 101 to 105, which constitute an inner-focus-type lens system, are respectively a front lens group which is fixed, a second lens group for variation of magnification (variator lens), an iris, a third lens group which is fixed, and a forth lens group which has both the compensation function and the focusing function (focusing lens).

Switches 123 and 125, which are arranged to detect that the variator lens 102 and the focusing lens 105 are respectively located in predetermined reference positions (reset positions), are incorporated in a lens barrel together with photosensors 124 and 126. The switches 123 and 125 and the photosensors 124 and 126 constitute position detecting means. The switches 123 and 125 are respectively fixed to the variator lens 102 and the focusing lens 105 and are arranged to move integrally with the variator lens 102 and the focusing lens 105 being moved along an optical axis, respectively. Then, each of the switches 123 and 125 acts to block or not to block a light output of the photosensor 124 or 126, which is fixed to the lens barrel, at a middle point of a moving range of the variator lens 102 or the focusing lens 105. A light detecting part of the photosensor 124 or 126 produces a low-level signal or a high-level signal in accordance with the light output being blocked or not being blocked. Therefore, if a position where the output signal of the photosensor 124 or 126 changes its level is made to be a reference position, it can be detected whether the lens is located in the reference position.

Figure 2:
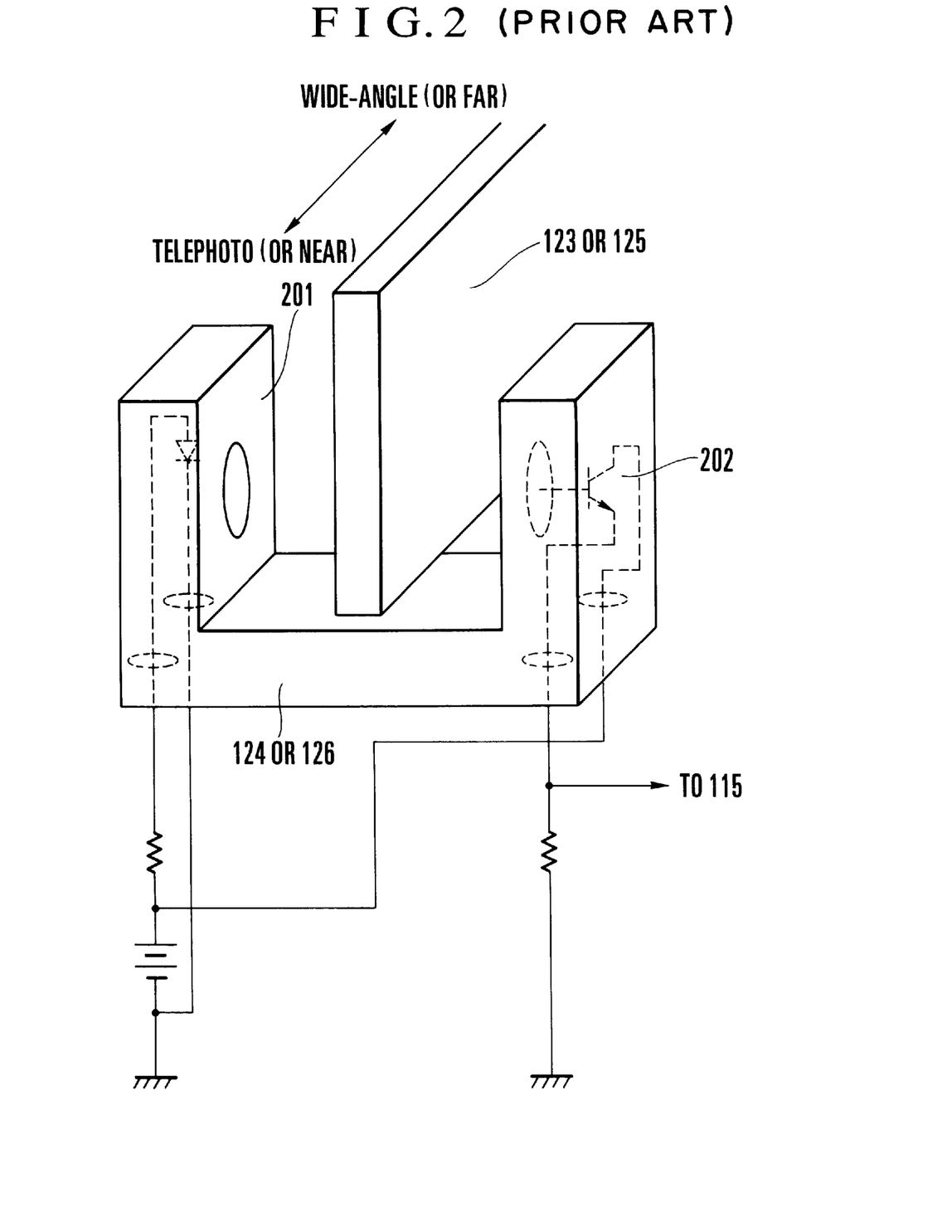
FIG. 2 is a diagram showing the construction of a photosensor switch in the first embodiment.

FIG. 2 is a diagram showing the construction of a reset switch for performing a resetting operation of a lens position counter. When an optical path from a light emitting part 201 to a light receiving part 202 (the light emitting part 201 and the light receiving part 202 constituting the photosensor 124 (or 126)) is blocked by a blocking plate 123 (or 125) which moves along the optical axis together with the lens, the output signal level of the light receiving part 202 becomes low, while when not blocked, the output signal level of the light receiving part 202 becomes high.

Object light having passed through the lens system is imaged on the surface of an image sensor 106, thereby being photoelectrically converted into a video signal. The video signal is processed by an amplifier 107 (or an impedance converter) and a camera signal processing circuit 108, and is then amplified by an amplifier 109 up to a prescribed level. The thus-amplified video signal is processed by a LCD display circuit 110, and is then supplied to a LCD 111, where a picked-up image is displayed.

Further, the video signal amplified by the amplifier 107 is supplied to an iris control circuit 112 and an AF evaluation value processing circuit 131. The iris control circuit 112 drives an IG driver 113 and an IG meter 114 in accordance with the level of the input video signal so as to control the iris 103, thereby performing a light-quantity control.

The AF evaluation value processing circuit 131 extracts only a high-frequency component of that part of the video signal which is obtained within a distance measuring frame, in accordance with a gate signal from a distance measuring frame forming circuit 116, and processes the extracted high-frequency component. An AF microcomputer 115 controls the driving of the lenses 102 and 105 and the change of an area of the distance measuring frame in accordance with the intensity of the AF evaluation signal.

Further, the AF microcomputer 115 is arranged to communicate with a system control microcomputer 121 (hereinafter referred to as a system controller). For example, information on a zoom switch 122 which is read by the system controller 121 using A/D conversion or the like, or zoom operation information such as the zooming direction or the focal length during zooming which is controlled by the AF microcomputer 115, is exchanged between the AF microcomputer 115 and the system controller 121. Incidentally, the zoom switch 122 is a unitized switch arranged to output a voltage corresponding to the rotation angle of an operation member, and a variable-speed zooming operation is performed according to the output voltage.

Drivers 117 and 119, each of which is able to change its current waveform, are respectively arranged to output driving energy to lens driving motors 118 and 120 in accordance with driving instructions for the variator lens 102 and the focusing lens 105 outputted from the AF microcomputer 115, respectively. Then, the motors 118 and 120 drive the variator lens 102 and the focusing lens 105, respectively.

Now, assuming that each of the lens driving motors 118 and 120 is a stepping motor, the driving method for the motors 118 and 120 will be described below.

The AF microcomputer 115 decides the driving speeds of the zoom motor 118 and the focus motor 120 by program processing, and sends rotation frequency signals indicative of the driving speeds of the zoom motor 118 and the focus motor 120 to the drivers 117 and 119, respectively. In addition to these signals, instructions or signals for driving-and-stopping and for the rotating directions of the motors 118 and 120 are also sent to the drivers 117 and 119, respectively. For the zoom motor 118, the driving-and-stopping signals and the rotation direction signals are prepared mainly according to the state of the zoom switch 122. For the focus motor 120, these signals are prepared according to the state of a driving instruction decided by a process performed within the AF microcomputer 115 at the time of AF (automatic focusing) and zooming. In accordance with the rotating direction signals, the motor drivers 117 and 119 set the exciting phases of four-phase motors to forward and reverse rotation phases and output applied voltages (or currents) for four motor exciting phases while varying the voltages (or currents) according to the rotation frequency signals received. The outputs of the motor drivers 117 and 119 are thus turned on and off according to the driving-and-stopping instructions while controlling the rotating direction and rotating frequency of the motors 118 and 120.

Figure 3:
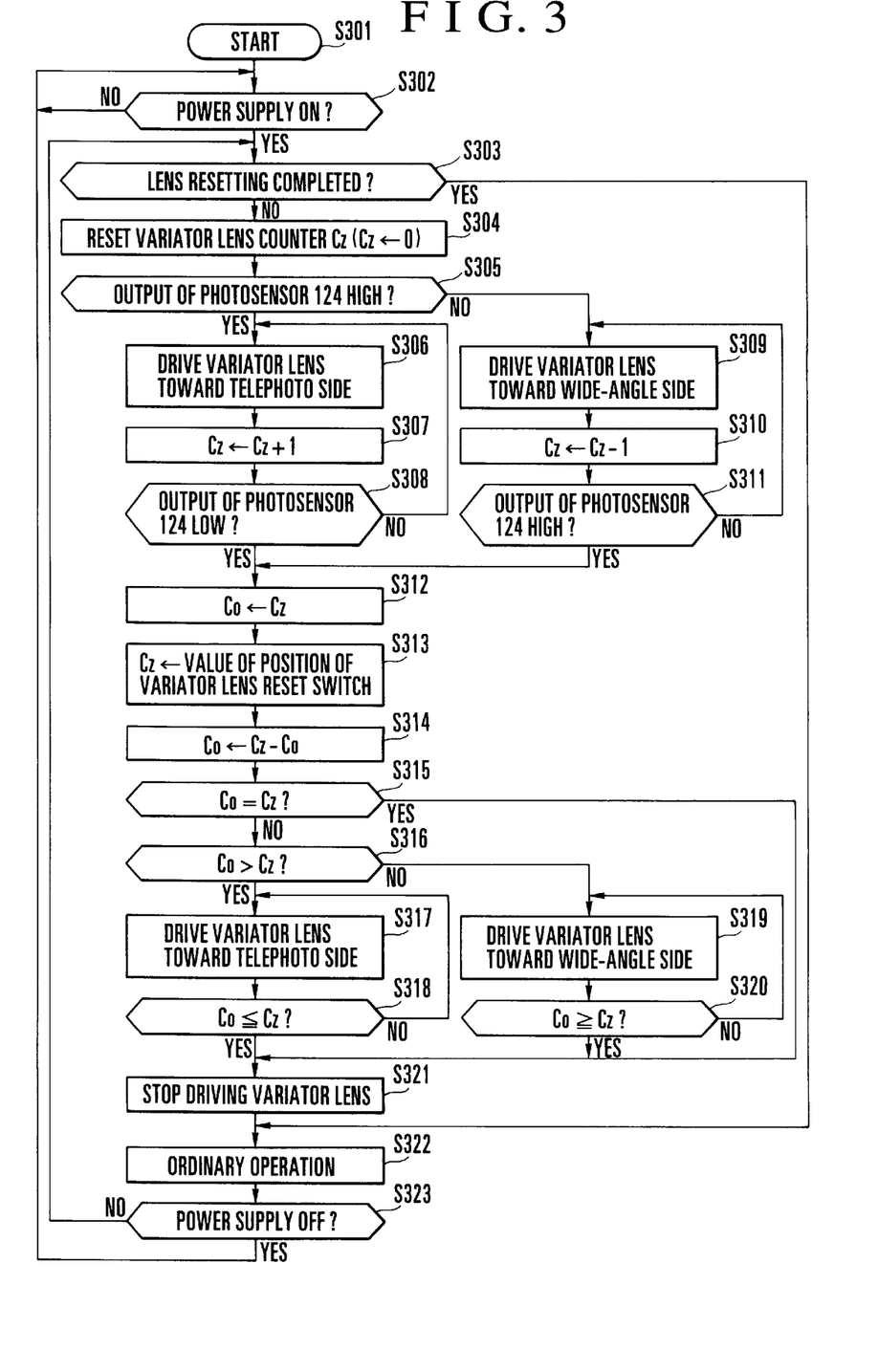
FIG. 3 is a flow chart showing the process of resetting a lens position counter for a variator lens in the first embodiment.

FIG. 3 is a flow chart showing a flow of the resetting operation to be performed on lens position counters which are disposed within the lens control AF microcomputer 115. The flow of these processes are arranged to be executed within the AF microcomputer 115.

Referring to FIG. 3, the flow of operation begins at a step S301. At a step S302, a check is made to find if a power supply is switched on. If not, the flow of operation waits there. When the power supply is found to be switched on, the flow proceeds to a step S303. At the step S303, a check is made to find if a lens position counter resetting action has been completed. If so, the flow proceeds from the step S303 to a step S322.

If not, the flow proceeds to a step S304. At the step S304, the variator lens position detecting counter Cz is cleared. At a step S305, a check is made to find if a signal outputted from the photosensor 124 is at a high level. In a case where the boundary between a light blocking part and a light transmitting part of the photosensor 124 is located approximately in the middle point of lens movable range, for example, it is possible to judge, from the state of the signal from the photosensor 124, whether the boundary is located on the telephoto side or on the wide-angle side of the current lens position.

In the case of FIG. 3, for example, if the signal from the photosensor 124 is at a low level, the photosensor 124 is blocked from light. In this instance, the variator lens 102 is located closer to the telephoto end position than the boundary. Therefore, the level of the signal of the photosensor 124 can be changed from the low level to a high level by moving the variator lens 102 toward the wide-angle side. If the signal of the photosensor 124 is at a high level in the beginning, the action is performed in a manner reverse to the above.

Therefore, with the check made for the state of the signal from the photosensor 124 at the step S305, if the signal of the photosensor 124 is found to be at a high level, the flow proceeds to a step S306 to obtain the boundary point by causing the variator lens 102 to be moved toward the telephoto end position. Further, in this case, the variator lens position detecting counter Cz is caused to increment its count value in synchronism with the step pulse of the zoom motor 118. At a step S308, a check is made to find if the signal of the photosensor 124 has changed to a low level. If not, the flow returns to the step S306 to repeat the same steps. Further, when the signal of the photosensor 124 is found to have changed to a low level at the step S308, the flow of operation proceeds to a step S312.

In a case where the signal of the photosensor 124 is found at the step S305 to be at a low level, the flow of operation proceeds to steps S309, S310 and S311 to carry out processes in a manner reverse to the above-stated processes of the steps S306, S307 and S308. When the change of the signal of the photosensor 1124 is found at the step S311, the flow proceeds to the step S312.

At the step S312, the count value of the counter Cz is indicating the number of step pulses of the zoom motor 118 obtained between the reset switch position and the variator lens position obtained before the resetting action immediately after the switching-on of the power supply. This value of the counter Cz represents a distance between the position of the variator lens 102 immediately before switching-on of the power supply and the reset switch position. Then, at the step S312, the value of the counter Cz is temporarily stored in a memory Co. At the counter Cz, some value that represents a reset switch position measured or determined beforehand, such as a reset switch position measured from an origin determined by optical design within the variator lens moving range and is converted into a step pulse number of the motor 118, is substituted (step S313). Upon completion of the process of the step S313, a resetting action on the zoom lens position detecting counter Cz is completed.

At a step S314, the value of the memory Co is subtracted from the value of the counter Cz newly obtained at the step S313. The result of subtraction is then newly substituted for the memory Co. At a step S314, since the initial absolute position of the variator lens 102 is obtained by using as a reference point a reset switch position which is measured from a certain origin (by subtracting a distance between the reset switch position and the initial variator lens position) and is substituted for the memory Co, the variator lens 102 can be brought back to its position obtained before the power supply is switched on by moving the variator lens 102 until the count value of the counter Cz becomes the value of the memory Co.

Further, in a case where the flow proceeds through the steps S309, S310 and S311, the value of the memory Co stored at the step S312 is at a negative value. With this value substituted in a formula shown at a step S314, the result of this step would become larger than the count value of the counter Cz of the step S313. However, this presents no problem as this indicates that the initial lens position is located closer to the telephoto end position than the reset switch. The initial lens position, i.e., the lens position obtained before the power supply is switched on, is thus obtained through the steps described above. After that, the flow proceeds to a step S315.

At a step S315, a check is made to find if the value of the return position (initial lens position) shown in the memory Co is equal to the value of the variator lens position counter Cz obtained after completion of the resetting action. If so, the flow proceeds to a step S321 as it shows that the variator lens 102 is already at its return position. If not, the flow proceeds to a step S316.

At the step S316, a check is made to find if the return position Co is larger than the current variator lens-position Cz. If so, the flow proceeds to a step S317 to drive and move the variator lens 102 toward the telephoto end position on the assumption that the return direction is in the telephoto end direction. At a step S318, a check is made to find if the variator lens 102 has reached the return position Co. If so, the flow proceeds from the step S318 to the step S321. If not, the flow repeats the steps S317 and S318. In a case where the return position Co is found at the step S316 to be smaller than the current variator lens position Cz, the return position is considered to be located closer to the wide-angle end position than the current position of the variator lens 102, and the flow then proceeds to a step S319. At steps S319 and S320, processes are executed in a manner reverse to those of the above-stated steps S317 and S318. At the step S320, if the variator lens 102 is decided to have reached the return position, the flow proceeds from the step S320 to the step S321.

At the step S321, the variator lens 102 is stopped from being driven. At the next step S322, an ordinary image pickup operation is carried out after images are outputted. At a step S323, a check is made to find if the power supply is cut off. If so, the flow returns to the step S302. If not, the flow returns to the step S303.

Figure 4:
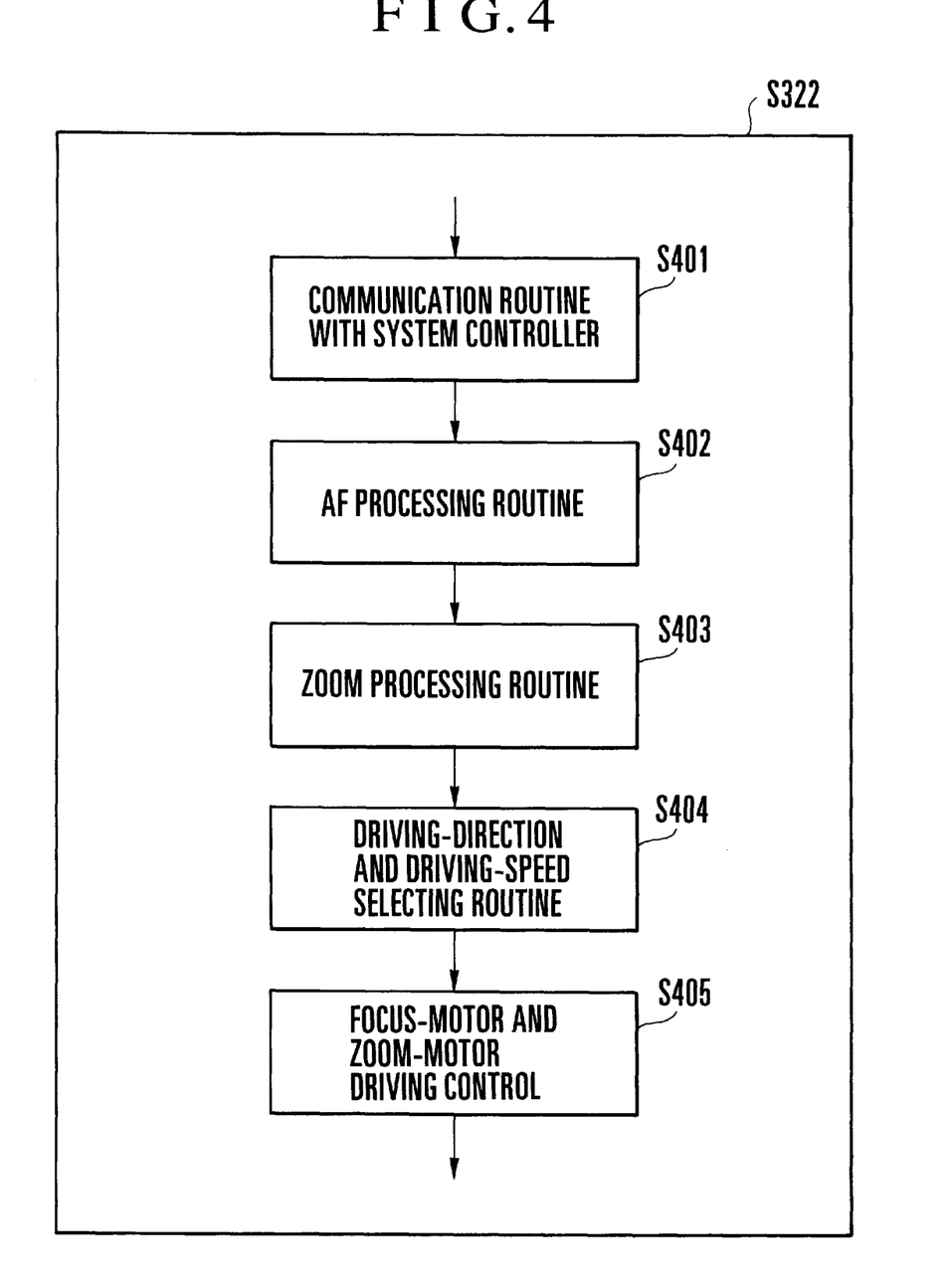
FIG. 4 is a flow chart showing the details of an ordinary operation in the first embodiment.

FIG. 4 shows the details of the ordinary image pickup operation performed at the step S322 of FIG. 3. This part of flow is executed within the lens control AF microcomputer 115. A step S401 is the routine of communication between the lens control AF microcomputer 115 and the system controller 121. Information on the zoom switch unit, zooming such as a variator lens position, etc., is exchanged. A step S402 is the routine of AF processes, such as processing a sharpness signal for the AF evaluation signal by using a signal obtained from the AF evaluation value processing circuit 131 and performing an automatic focusing process according to changes taking place in the evaluation signal. A step S403 is the routine of a zooming process. In zooming, this routine is performed to carry out a compensating action for maintaining an in-focus state by computing the direction and speed of driving the focusing lens 105 in such a way as to trace a cam locus.

A step S404 is the routine of selecting one of directions and speeds of driving computed at the steps S402 and S403 for zooming and focusing according to the AF and zooming operations. The routine of the step S404 is thus arranged to prevent lenses from hitting their mechanical end positions in such a manner that the lenses are driven not further from a software (electrically prescribed) telephoto end on the telephoto side, not further from a software wide-angle end on the wide-angle side, not further from a software nearest distance end on the nearest distance side, and not further from a software infinity distance end on the infinity distance side. At a step S405, control signals are sent to the motor drivers 118 and 120 according to the information on the directions and speeds of driving for zooming and focusing. The lenses 102 and 105 are thus driven and stopped under these control signals. After completion of the step S405, the flow returns to the step S323 of FIG. 3. The series of processes shown in FIG. 4 is carried out in synchronism with a vertical synchronizing period. In the process of returning from the step S323 to the step S303 of FIG. 3, the flow waits for arrival of the next vertical synchronizing signal.

Figure 5:
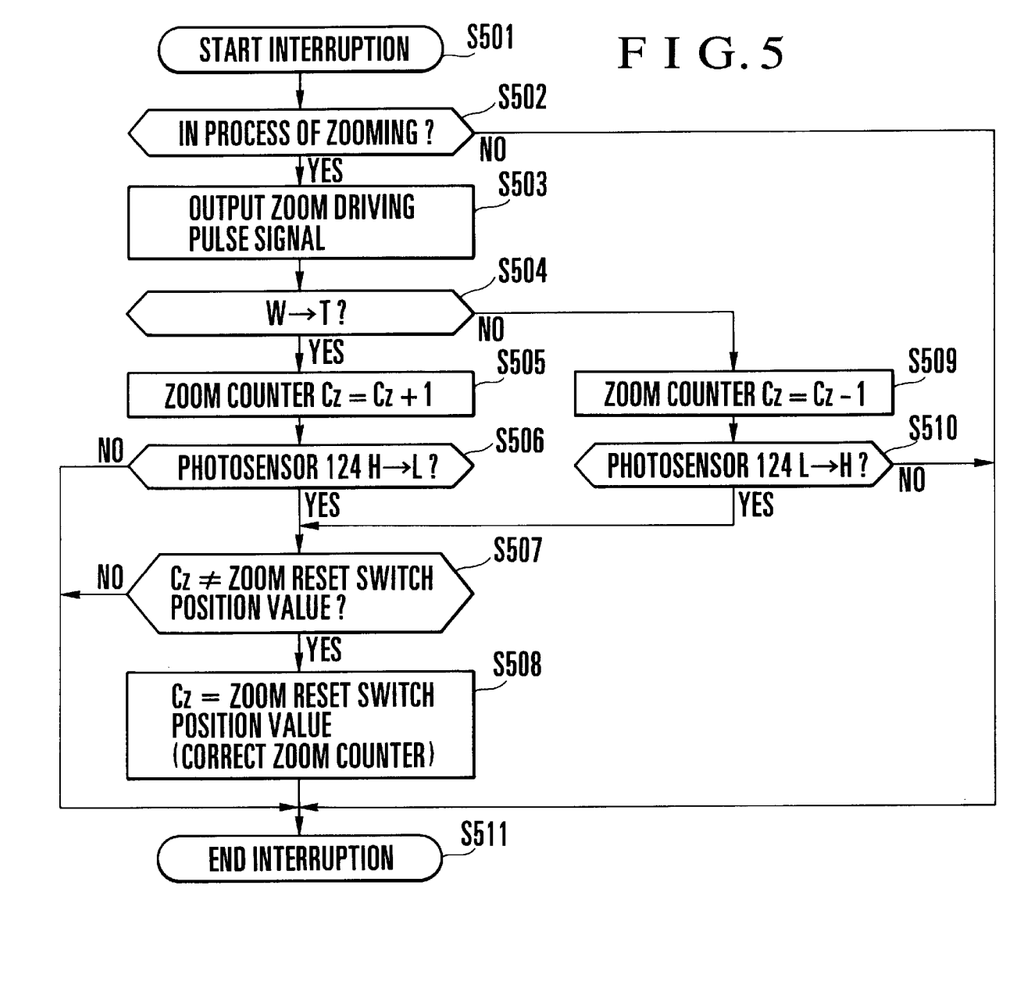
FIG. 5 is a flow chart showing an interruption process in the first embodiment.

The variator lens 102 is driven at the driving speed and with the driving pulses set at the step S405 by interruption processes, which are as shown in FIG. 5.

FIG. 5 is a flow chart showing a flow of the interruption processes. The interruption is allowed by a timing decided by a driving speed set at the step S404 of FIG. 4. Interruption driving pulses are outputted in a fast cycle when the driving speed is fast and in a slow cycle when the driving speed is slow. At a step S501, the interruption starts. At a step S502, a check is made to find if zooming is in process. If not, the flow proceeds to a step S511 to terminate the interruption. If so, the flow proceeds to a step S503 to output driving pulses for zooming.

At the next step S504, a check is made to find if the zooming action is toward the telephoto end. If so, the flow proceeds to a step S505 to increment the count value Cz of the zoom counter. AT a step S506, a check is made to find if the output of the photosensor 124 shown in FIGS. 1 and 2 has been changed by the output of the zoom driving pulses from a high level to a low level. If not, the flow proceeds to the step S511 to terminate the interruption. If so, the flow proceeds to a step S507. At the step S507, a check is made to find if the current zoom counter value Cz is the same as the value of the zoom reset switch position. If so, the flow proceeds to the step S511 to terminate the interruption. If not, the lens system is considered to have come out of order to have a discrepancy between the zoom count position of the AF microcomputer 115 and the variator lens position. The flow then proceeds to a step S508. At the step S508, the zoom reset switch position value is substituted for the zoom counter value Cz of the AF microcomputer 115. With the zoom counter value Cz reset in this manner, the flow proceeds to the step S511 to terminate the interruption.

If the zooming is found at the step S504 to be toward the wide-angle end position, the zoom counter value Cz is decremented. At a step S510, a check is made to find if the output of the photosensor 124 has been caused to change from a low level to a high level by the output of the zooming driving pulses. If not, the flow proceeds to the step S511 to terminate the interruption. If so, the flow proceeds to the steps S507 and S508 to perform the processes in the same manner as in the case of the zooming toward the telephoto end position.

The first embodiment is arranged, as described above, to constantly monitor the state of the photosensor switch while zooming is in process, not only at a time when the initial zoom counter resetting action is performed immediately after the power supply is switched on. If the zoom counter is found to be out of order, the count value of the zoom counter is reset (rectified), so that an out-of-order state of the microcomputer and the lens can be corrected and restored without varying the state of picked-up images.

While the resetting action on the variator lens position counter in the first embodiment has been described above, the resetting action can be applied also to the focusing lens 105 in the same manner as in the variator lens 102. In the case of a second embodiment of the invention, respective position counters for the variator lens 102 and the focusing lens 105 are arranged to be reset. The hardware arrangement of the second embodiment is identical with that of the first embodiment described above.

The resetting action on the focusing lens 105 is as described below with reference to FIG. 6.

Figure 6:
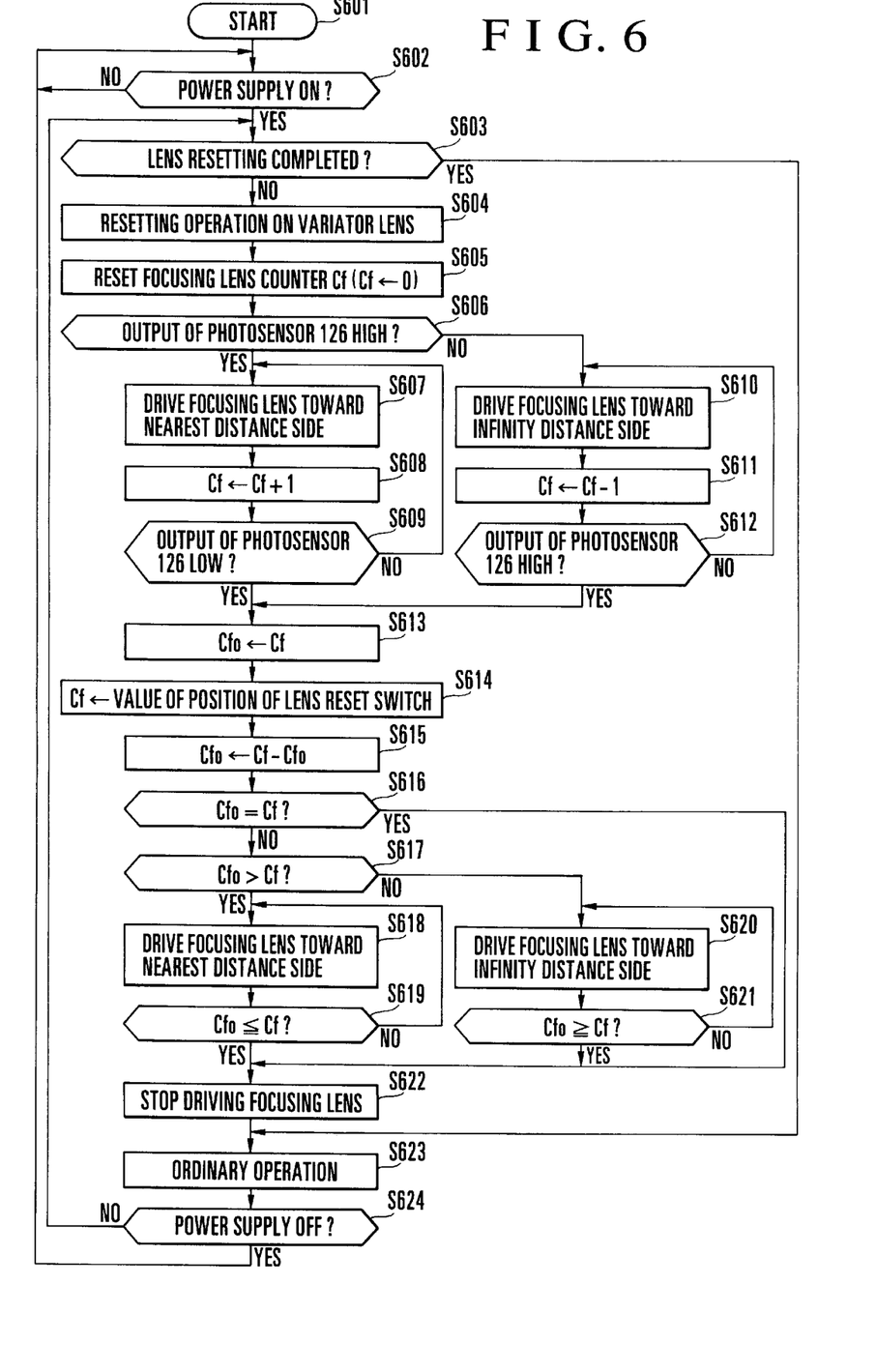
FIG. 6 is a flow chart showing the process of resetting a lens position counter in a second embodiment of the invention.

A flow of processes starts at a step S601 of FIG. 6. At a step S602, the flow waits until the power supply is switched on. When the power supply is switched on, the flow proceeds to a step S603. At the step S603, a check is made to find if a lens position counter resetting action has been completed. If so, the flow proceeds from the step S603 to a step S623. If not, the flow proceeds to a step S604. At the step S604, the variator lens resetting action is performed on the variator lens 102 in the same manner as shown in FIG. 3. Processes of steps S605 to S615 are executed in the same manner as the steps S304 to S314 of FIG. 3 and executed for detecting the reset switch position of the focusing lens 105.

At the step S605, the focusing lens position detecting counter Cf is cleared. At a step S606, a check is made to find if a signal outputted from the photosensor 126 is at a high level. In a case where the boundary between a light blocking part and a light transmitting part of the photosensor 126 is located approximately in the middle point of a moving range of the focusing lens 105, for example, it is possible to judge, from the state of the signal from the photosensor 126, whether the boundary is located on the near distance side or on the infinity distance side of the current lens position. In the case of FIG. 2, for example, if the signal from the photosensor 126 is at a low level, the photosensor 126 is blocked from light. In this instance, the focusing lens 105 is located closer to the nearest distance position than the boundary. Therefore, the level of the signal of the photosensor 126 can be changed from the low level to a high level by moving the focusing lens 105 toward the infinity distance end position. If the signal of the photosensor 126 is at a high level in the beginning, the action is performed in a manner reverse to the above.

Therefore, with the check made for the state of the signal from the photosensor 126 at the step S606, if the signal of the photosensor 126 is found to be at a high level, the flow proceeds to a step S607 to obtain the boundary point by causing the focusing lens 105 to be moved toward the nearest distance end position. Further, in this case, at a step S608, the count value of the focusing lens position detecting counter Cf is incremented in synchronism with the step pulse of the focus motor 120. At a step S609, a check is made to find if the signal of the photosensor 126 has changed to a low level. If not, the flow returns to the step S607 to repeat the same steps. Further, when the signal of the photosensor 126 is found to have changed to a low level at the step S609, the flow of operation proceeds to a step S613.

In a case where the signal of the photosensor 126 is found at the step S606 to be at a low level, the flow of operation proceeds to steps S610 to S612 to carry out processes in a manner reverse to the above-stated processes of the steps S607 to S609. When the change of the signal of the photosensor 126 is verified at the step S612, the flow of operation proceeds to the step S613.

At the step S613, the count value of the counter Cf is indicating the number of step pulses of the focus motor 120 obtained between the focusing lens position before the resetting action immediately after the switching-on of the power supply and the reset switch position. This value of the counter Cf represents a distance between the position of the focusing lens 105 immediately before the switching-on of the power supply and the reset switch position. Then, at the step S613, the value of the counter Cf is temporarily stored in a memory Cfo. At the counter Cf, some value that represents a reset switch position measured or determined beforehand, such as a reset switch position measured from an origin determined by optical design within the variator lens moving range and is converted into a step pulse number of the motor 120, is substituted. Upon completion of the process of the step S614, a resetting action on the focusing lens position detecting counter Cf is completed.

At a step S615, the value of the memory Cfo is subtracted from the value of the counter Cf newly obtained at the step S614. The result of subtraction is then newly substituted for the memory Cfo. At a step S615, since the initial absolute position of the focusing lens 105 is obtained by using as a reference point a reset switch position which is measured from a certain origin (by subtracting a distance between the reset switch position and the initial focusing lens position) and is substituted for the memory Cfo, the focusing lens 105 can be brought back to its position obtained before the power supply is switched on by moving the focusing lens 105 until the count value of the counter Cf becomes the value of the memory Cfo. With the initial lens position obtained in this manner, the flow proceeds from the step S615 to a step S616.

At the step S616, a check is made to find if the value of the return position shown in the memory Cfo is equal to the value of the focusing lens position counter Cf obtained after completion of the resetting action. If so, the flow proceeds to a step S622 as it shows that the focusing lens 105 is already at its return position. If not, the flow proceeds to a step S617. At the step S617, a check is made to find if the return position Cfo is larger than the current focusing lens position Cf. If so, the flow proceeds to a step S618 to drive and move the focusing lens 105 toward the nearest distance position on the assumption that the return direction is in the direction of nearest distance. At a step S619, a check is made to find if the focusing lens 105 has reached the return position Cfo. If so, the flow proceeds from the step S619 to a step S622. If not, the flow repeats the steps S618 and S619. In a case where the return position Cfo is found at the step S617 to be smaller than the current focusing lens position Cf. the return position is considered to be located closer to the infinity distance end than the current position of the focusing lens 105, and the flow then proceeds to a step S620. At steps S620 and S621, processes are executed in a manner reverse to those of the above-stated steps S618 and S619. At the step S621, if the focusing lens 105 is decided to have reached the return position, the flow proceeds to the step S622.

At the step S622, the focusing lens 105 is stopped from being driven. At a step S623, an ordinary image pickup operation is carried out after images are outputted. At a step S624, a check is made to find if the power supply is cut off. If so, the flow returns to a step S602.

Figure 7:
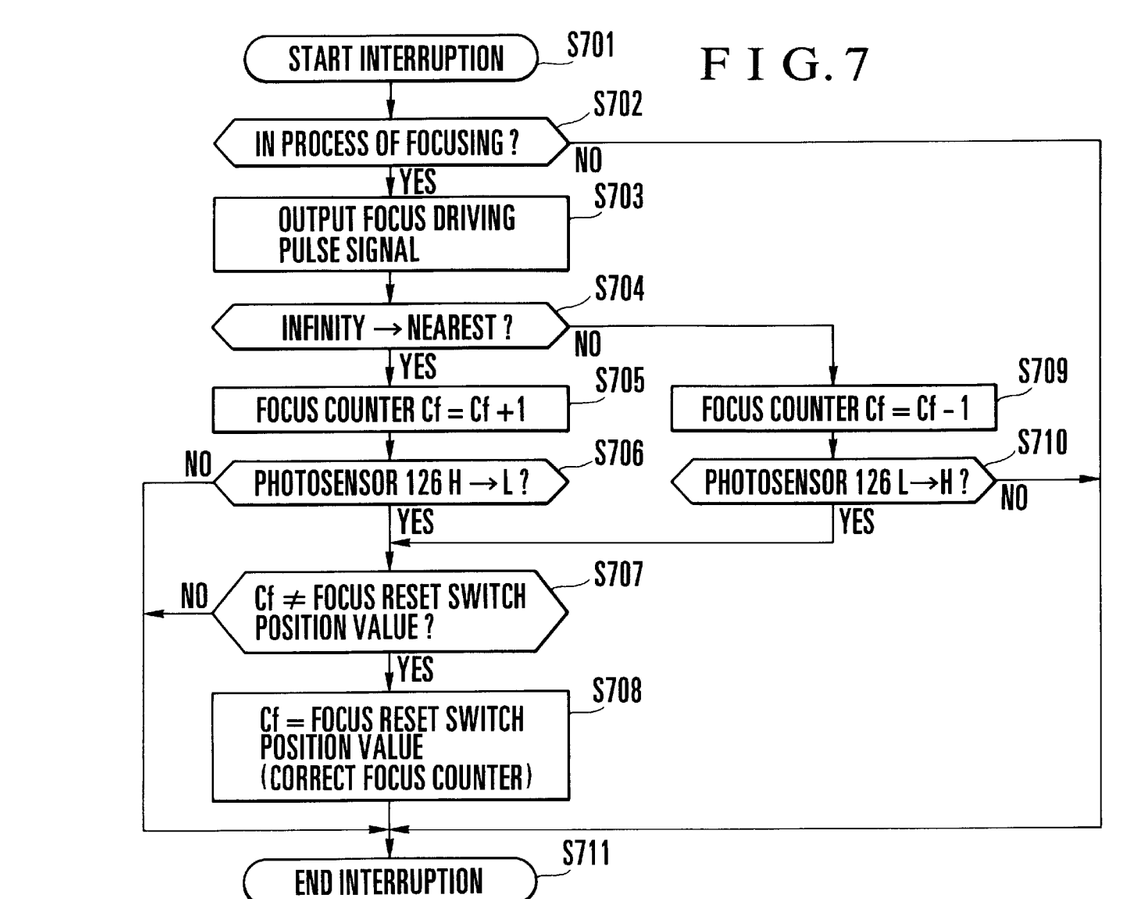
FIG. 7 is a flow chart showing an interruption process in the second embodiment.

FIG. 7 is a flow chart showing a flow of interruption processes for driving the focusing lens 105. The interruption is allowed by a timing decided by a driving speed set at the step S404 of FIG. 4. Interruption driving pulses are outputted in a fast cycle when the driving speed is fast and in a slow cycle when the driving speed is slow. At a step S701, the interruption starts. At a step S702, a check is made to find if the focus driving is in process. If not, the flow proceeds to a step S711 to terminate the interruption. If so, the flow proceeds to a step S703 to output focusing lens driving pulses.

At the next step S704, a check is made to find if the focus driving is toward the nearest distance end. If so, the flow proceeds to a step S705 to increment the count value Cf of the focus counter. At a step S706, a check is made to find if the output of the photosensor 126 has been changed by the output of the focus driving pulses from a high level to a low level. If not, the flow proceeds to the step S711 to terminate the interruption. If so, the flow proceeds to a step S707. At the step S707, a check is made to find if the current focus counter value Cf (focus position) is the same as the value of the focus reset switch position. If so, the flow proceeds to the step S711 to terminate the interruption. If not, the lens system is considered to have come out of order to have a discrepancy between the focus count position of the AF microcomputer 115 and the focusing lens position. The flow then proceeds to a step S708. At the step S708, the focus reset switch position value is substituted for the focus counter value Cf of the AF microcomputer 115. With the focus counter value Cf reset in this manner, the flow proceeds to the step S711 to terminate the interruption.

If the focus driving is found at the step S704 to be toward the infinity distance end, the focus counter value Cf is decremented. At a step S710, a check is made to find if the output of the photosensor 126 has been caused to change from a low level to a high level by the output of the focus driving pulses. If not, the flow proceeds to the step S711 to terminate the interruption. If so, the flow proceeds to the steps S707 and S708 to perform the processes in the same manner as in the case of the focus driving toward the nearest distance position.

In addition to the advantage of the first embodiment, the arrangement of the second embodiment, as described above, gives the following advantage.

The second embodiment is arranged to constantly monitor the state of the photosensor switch while zooming is in process, not only at a time when the initial focus counter resetting action is performed immediately after the power supply is switched on. If the zoom counter is found to be out of order, the count value of the focus counter is reset (rectified), so that an out-of-order state of the microcomputer and the lens can be corrected and restored without varying the state of picked-up images.

In the case of the first and second embodiments, not only the initial counter resetting action is performed when the power supply is switched on, but the state of the photosensor is constantly monitored and, if the counter is found to be in error, the counter is reset so that the lenses and the microcomputer can be saved from coming out of order without changing the state of picked-up images. However, this method necessitates monitoring the output of the photosensor while keeping a power supply of the photosensor in an on-state, and thus causes an increase in power consumption.

To solve this problem, a third embodiment of the invention is arranged to turn on the power supply of the photosensor only at the time of driving the lens.

Figure 8:
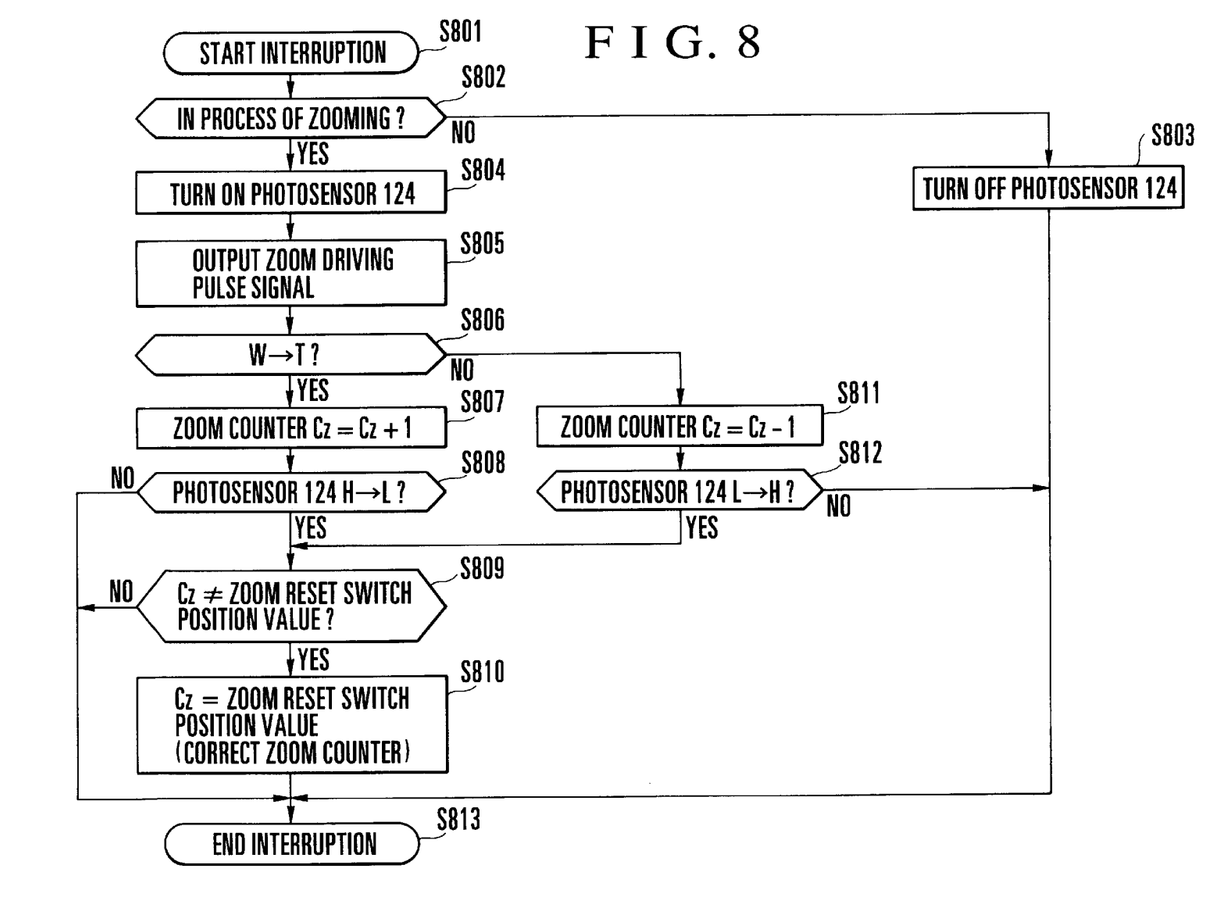
FIG. 8 is a flow chart showing an interruption process in a third embodiment of the invention.

FIG. 8 shows a feature of the third embodiment in a flow of interruption processes for zoom driving. The interruption is allowed to start at a step S801. At a step S802, a check is made to find if zooming is in process. If not, the flow proceeds to a step S803 to turn off the power supply of the photosensor 124, and the interruption is terminated at a step S813. If so, the flow proceeds to a step S804 to turn on the power supply the photosensor 124. At a step S805, zoom driving pulses are outputted.

Steps S806 to S812 are executed in the same manner as the steps S504 to S510 of FIG. 5. At these steps S806 to S812, the zoom counter is reset if the value of the zoom counter is found to be deviating.

As described above, the third embodiment is arranged to constantly monitor the state of the photosensor switch while zooming is in process, not only at a time when the initial zoom counter resetting action is performed immediately after the power supply is switched on. If the zoom counter is found to be out of order, the count value of the zoom counter is reset. In that event, the power supply of the photosensor is allowed to be turned on only during the process of zoom driving and is otherwise kept off, so that an out-of-order state of the microcomputer and the lens can be corrected and restored without varying the state of picked-up images while paying heed to power saving.

While the above description covers the variator lens driving system of the third embodiment, the flow of processes can be carried out in the same manner also for the focusing lens driving system.

In attaining the purpose that, after the initial counter resetting action is performed when the power supply is switched on, the state of the photosensor is constantly monitored and, if the counter is found to be in error, the counter is reset to save the lenses and the microcomputer from coming out of order without changing the state of picked-up images, the third embodiment is arranged to save power by turning on the power supply of the photosensor only in driving the lens and by turning off the power supply of the photosensor when the lens is not driven. However, the power consumption can be further saved by the following method.

The encoders of the zoom and focus counters do not simply come out of order. The state of deviation of them takes place only under special conditions, such as mechanical impacts or electrical noises. The performance of the lens system does not deteriorate even if the state of the photosensor is not always monitored. Further, the changes of output level of the photosensor from a high level to a low level and vice versa take place with some hysteresis. Therefore, information can be obtained more accurately by monitoring the change in one of the two directions, i.e., from a high level to a low level and vice versa. This method is described below as a fourth embodiment of the invention.

Figure 9:
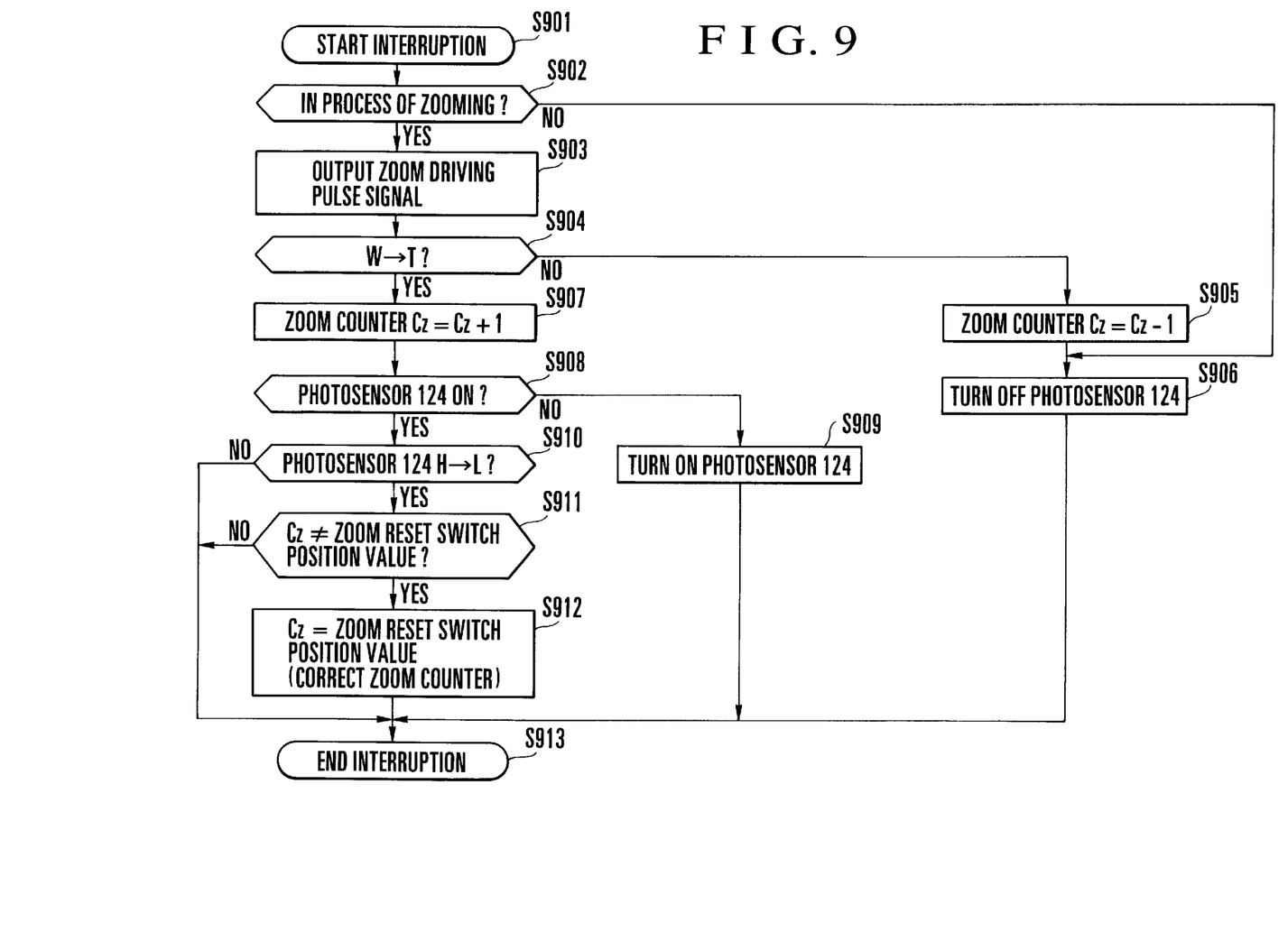
FIG. 9 is a flow chart showing an interruption process in a fourth embodiment of the invention.
Figure 10:
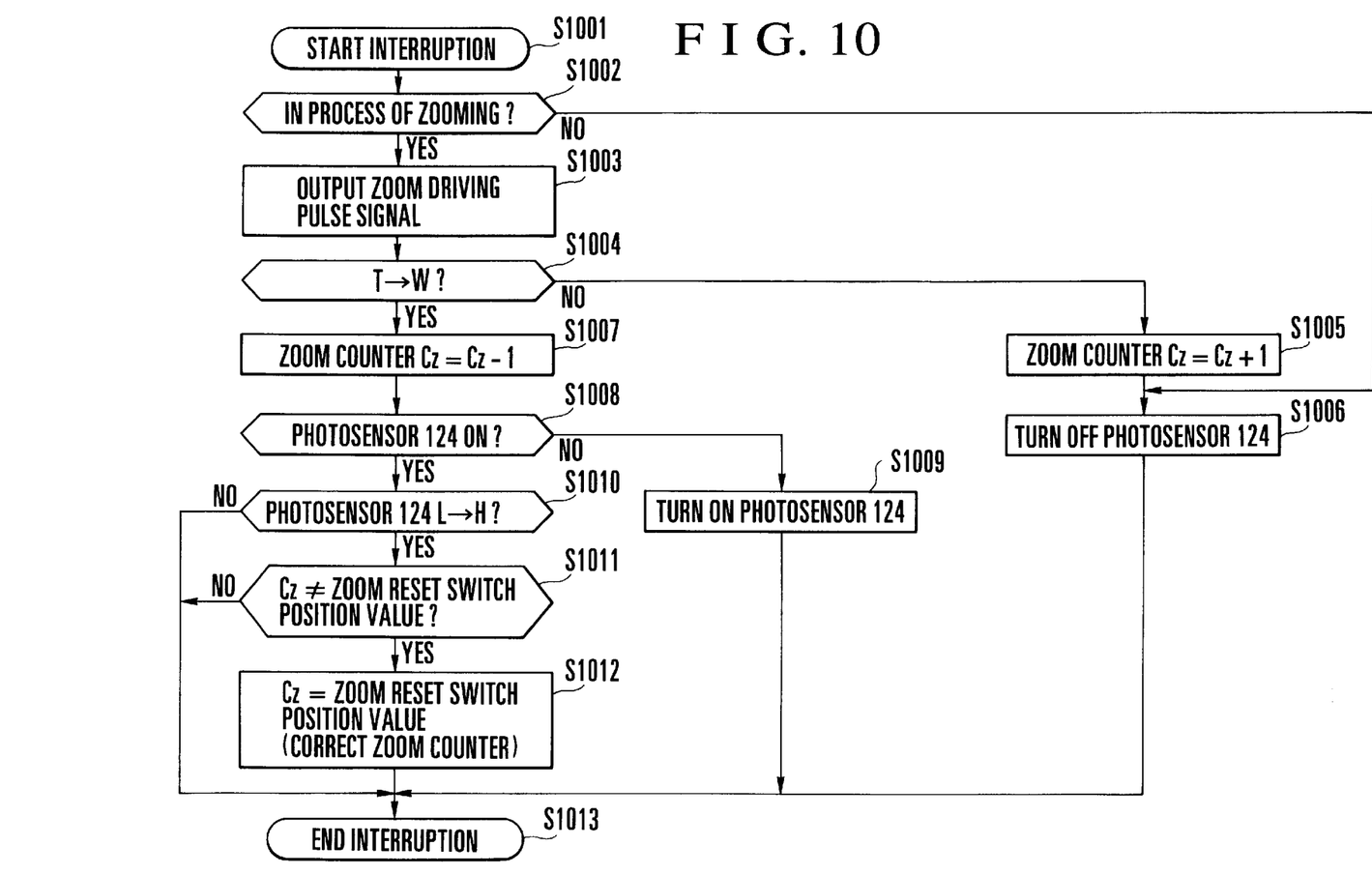
FIG. 10 is a flow chart showing another interruption process in the fourth embodiment.

FIGS. 9 and 10 are flow charts showing flows of operation of the fourth embodiment of the invention. In the case of FIG. 9, the power supply of the photosensor is turned on for zoom driving only toward the telephoto end to monitor only the change of the output of the photosensor from a high level to a low level. FIG. 10 shows another case in which the power supply of the photosensor is turned on for zoom driving only toward the wide-angle end to monitor only the change of the output of the photosensor from a low level to a high level.

As described above, the fourth embodiment is arranged to monitor, while zoomingis in process, the change in output state of the photosensor switch either in the direction from a high level to a low level or from a low level to a high level, not only to perform the initial zoom counter resetting action when the power supply is switched on. If the zoom counter is found to be out of order, the count value of the zoom counter is reset. In that event, the power supply of the photosensor is controlled to be turned on or off, so that an out-of-order state of the microcomputer and the lens can be corrected and restored without varying the state of picked-up images while paying heed to power saving.

While the above description covers the variator lens driving system of the fourth embodiment, the flow of processes can be carried out in the same manner also for the focusing lens driving system.

According to the arrangements of the embodiments disclosed, lens positions can be accurately controlled as necessary without restarting the power supply.

What is claimed is:

1. A lens control apparatus comprising:
   a lens for photographing an image;
   driving means for driving said lens;
   position detecting means for detecting that said lens is in a reset position;
   position indicating means for indicating a position of said lens; and
   rectifying means for rectifying the position indicated by said position indicating means to said reset position every time said lens passes said reset position during a photographing operation after a resetting operation responsive to Power-on is completed.

2. A lens control apparatus according to claim 1, wherein said rectifying means rectifies the position indicated by said position indicating means even when a power supply of said lens control apparatus is turned on and said lens is driven by said driving means up to said reset position.

3. A lens control apparatus according to claim 1, wherein a power supply of said position detecting means is in an on-state while a power supply of said lens control apparatus is in an on-state.

4. A lens control apparatus according to claim 1, wherein a power supply of said position detecting means is in an on-state only when said driving means is operating.

5. A lens control apparatus according to claim 1, wherein said rectifying means rectifies the position indicated by said position indicating means only when said lens passes said reset position in one direction.

6. A lens control apparatus according to claim 1, wherein said lens is a lens of a surveillance camera.

7. A lens control apparatus according to claim 1, wherein said lens is an inner-focus-type lens system.

8. A lens control method comprising:

a driving step of driving a lens; and a rectifying step of, every time said lens being driven by said driving step passes a reset position, rectifying to said position an indication provided by-position indicating means for indicating a position of said lens during a photographing operation after a resetting operation responsive to Power-on is completed.

9. A storage medium which stores therein a program for executing a lens control method according to claim 8.

10. A lens control apparatus comprising:

lens;

a stepping motor which drives said lens;

a counter which counts driving pulses for said stepping motor;

detecting means for detecting that said lens has moved to a reset position; and control means for performing a resetting operation of said counter when said lens passes said reset position during an image pickup operation after a resetting operation responsive to Power-on is completed.

11. A lens control apparatus according to claim 10, wherein the resetting operation by said control means is an operation of loading, onto said counter, a driving pulse number for said stepping motor corresponding to a moving distance from an end of a moving range of said lens to said reset position.

12. A lens control apparatus according to claim 10, wherein said lens is an inner-focus-type lens system.

13. A lens control apparatus according to claim 12, wherein said control means performs the resetting operation by interruption, and varies a period of said interruption in accordance with a driving speed of said variator lens.

14. A video camera comprising:

a lens;

a motor for driving said lens;

position sensor which detects that said lens is in a reset position;

position indicator which generates a signal indicating a moving position of said lens; and corrector which corrects the moving position indicated by said position indicator to said reset position every time said lens passes said reset position during a photographing operation after a resetting operation responsive to power-on is completed.

15. A lens control apparatus according to claim 14, wherein said corrector corrects the position indicated by said position indicator when a power supply of said lens control apparatus is turned on and said lens is driven by said motor up to said reset position.

16. A video camera according to claim 14, wherein a power supply of said position sensor is in an on-state while a power supply of said lens control apparatus is in an on-state.

17. A video camera according to claim 14, wherein a power supply of said position sensor is in an on-state only when said motor is operating.

18. A video camera according to claim 14, wherein said corrector corrects the position indicated by said position sensor only when said lens passes said predetermined reset position in one direction.

19. A lens video camera according to claim 14, wherein said lens is an inner-focus-type lens system.

* * * * *